United States Patent
Rout et al.

(10) Patent No.: US 10,014,617 B2
(45) Date of Patent: Jul. 3, 2018

(54) ELECTRICAL DISTRIBUTION APPARATUS INCLUDING BARRIER AND METHODS OF ASSEMBLING SAME

(71) Applicant: General Electric Company, Schenectady, NY (US)

(72) Inventors: Tapas Ranjan Rout, Telangana (IN); Leonardo Dorea Mascarenhas, Agawam, MA (US); Suresh M, Telangana (IN); Fernando Jorge de Sousa Braga, Maia (PT); Tyler Braden Diomedi, Plainville, CT (US); Yogesh Ingole, Telangana (IN); Mariusz Duda, Berlin, CT (US); Jorge Juan Bonilla Hernandez, Madrid (ES); Mukesh Jain, Telangana (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/402,401

(22) Filed: Jan. 10, 2017

(65) Prior Publication Data

US 2018/0138626 A1  May 17, 2018

(30) Foreign Application Priority Data

Nov. 11, 2016 (IN) .............................. 201641038587

(51) Int. Cl.
*H01R 13/447* (2006.01)
*H01R 43/26* (2006.01)
(Continued)

(52) U.S. Cl.
CPC ............. *H01R 13/447* (2013.01); *H01R 4/28* (2013.01); *H01R 43/26* (2013.01); *H02B 1/04* (2013.01); *H02B 1/20* (2013.01)

(58) Field of Classification Search
CPC ........ H01R 13/447; H01R 4/28; H01R 43/26; H02B 1/20; H02B 1/04
(Continued)

(56) References Cited

U.S. PATENT DOCUMENTS 5,327,321 A * 7/1994 Rosen ...................... H02B 1/14
200/50.22
5,351,165 A * 9/1994 Hancock ................ H02B 1/056
174/68.2
(Continued)

FOREIGN PATENT DOCUMENTS

WO  2014209350 A1  12/2014
WO  2015029528 A1  3/2015

*Primary Examiner* — Steven T Sawyer
*Assistant Examiner* — Yahya Ahmad
(74) *Attorney, Agent, or Firm* — General Electric Company

(57) ABSTRACT

An electrical distribution apparatus includes a power connector for coupling to a cable. The power connector includes a first end and a second end each defining an opening arranged to receive the cable. A barrier is removably coupled to a portion of the electrical distribution apparatus and selectively adjustable between a first position and a second position, the barrier arranged to prevent insertion of the cable into the first end opening and to permit insertion of the cable into the second end opening when the barrier is in the first position, the barrier arranged to prevent insertion of the cable into the second end opening and to permit insertion of the cable into the first end opening when the barrier is in the second position.

20 Claims, 12 Drawing Sheets

(51) Int. Cl.
*H02B 1/04* (2006.01)
*H01R 4/28* (2006.01)
*H02B 1/20* (2006.01)

(58) Field of Classification Search
USPC .................................................. 361/622–658
See application file for complete search history.

(56) References Cited

U.S. PATENT DOCUMENTS

| | | | | |
|---|---|---|---|---|
| 5,486,666 | A * | 1/1996 | Wong | H01H 9/0264 200/304 |
| 5,933,319 | A * | 8/1999 | Buckner | H02B 1/056 200/50.22 |
| 6,497,592 | B1 * | 12/2002 | Beadle | H01R 9/2425 439/718 |
| 6,936,781 | B2 * | 8/2005 | Quintanilla | H01H 9/0264 200/293 |
| 2005/0109597 | A1 * | 5/2005 | Etscheidt | H01H 9/0264 200/293 |
| 2014/0273586 | A1 * | 9/2014 | Sandwith | H01R 13/53 439/345 |
| 2015/0236432 | A1 * | 8/2015 | Lin | H01R 13/5841 439/367 |

* cited by examiner

ELECTRICAL DISTRIBUTION APPARATUS INCLUDING BARRIER AND METHODS OF ASSEMBLING SAME

CROSS REFERENCE TO RELATED APPLICATIONS

This application claims priority to Indian Patent Application No. 201641038587, filed Nov. 11, 2016, which is hereby incorporated by reference in its entirety.

BACKGROUND

The field of the disclosure relates generally to electrical distribution apparatuses, and more particularly, to an electrical distribution apparatus including at least one power connector and a barrier at least partially restricting access to the at least one power connector.

At least some known electrical distribution apparatuses are configured to control electrical distribution from a main to one or more branch circuits. Accordingly, at least some known electrical distribution apparatuses include power connectors such as terminals or lugs for coupling to the circuits. For example, in some electrical distribution apparatuses, a load terminal is positioned on an end of the electrical distribution apparatus and a line terminal is positioned on an opposite end of the electrical distribution apparatuses. In addition, electrical devices, such as circuit breakers, are coupled to the electrical distribution apparatus along an electrically conductive path between the load terminal and the line terminal. Current flows through the electrical distribution apparatus from the line terminal to the load terminal. When the electrical distribution apparatus has a reverse feed, the current flows through the electrical distribution apparatus from the load terminal to the line terminal.

In at least some known electrical distribution apparatus, it is desirable to restrict access to electrically charged components of the electrical distribution apparatus, such as the power connectors. For example, at least some regulations require that the accessibility of electrically charged components of electrical distribution apparatuses is limited during operation of the electrical distribution apparatus. As a result, the cost to manufacture and assemble the electrical distribution apparatuses is increased.

BRIEF DESCRIPTION

In one aspect, an electrical distribution apparatus is provided. The electrical distribution apparatus includes a power connector for coupling to a cable. The power connector includes a first end and a second end each defining an opening arranged to receive the cable. A barrier is removably coupled to a portion of the electrical distribution apparatus and selectively adjustable between a first position and a second position, the barrier arranged to prevent insertion of the cable into the first end opening and to permit insertion of the cable into the second end opening when the barrier is in the first position, the barrier arranged to prevent insertion of the cable into the second end opening and to permit insertion of the cable into the first end opening when the barrier is in the second position.

In another aspect, a barrier for an electrical distribution apparatus is provided. The barrier includes an engagement feature to removably couple said barrier to the electrical distribution apparatus, wherein the barrier is selectively adjustable between a first position and a second position, the barrier arranged to prevent insertion of a cable into an opening defined by a first end of a power connector and to permit insertion of the cable into an opening defined by a second end of the power connector when the barrier is in the first position, said barrier arranged to prevent insertion of the cable into the second end opening of the power connector and to permit insertion of the cable into the first end opening of the power connector when the barrier is in the second position.

In yet another aspect, a method of assembling an electrical distribution apparatus is provided. The method includes coupling a power connector to a support structure, the power connector including a first end and a second end each defining an opening arranged to receive a cable. The method further includes coupling a barrier to the electrical distribution apparatus such that the barrier extends over the power connector, and adjusting the barrier between a first position and a second position, wherein the barrier is arranged to prevent insertion of the cable into the first end opening and to permit insertion of the cable into the second end opening when the barrier is in the first position, and wherein the barrier is arranged to prevent insertion of the cable into the second end opening and to permit insertion of the cable into the first end opening when the barrier is in the second position.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Exemplary embodiments of electrical distribution apparatuses and methods of manufacturing electrical distribution apparatuses are described herein. The electrical distribution apparatuses include a removable barrier that restricts access to electrically conductive components of the electrical distribution apparatus. The removable barrier has multiple configurations that facilitate different electrical connections between the electrical distribution apparatus and a circuit. In addition, in some embodiments, removable shields are selectively coupled to the barrier to restrict access to electrically charged components of the electrical distribution apparatus. In addition, in some embodiments, the barrier is secured in position and adjusted without the use of tools.

Figure 1:
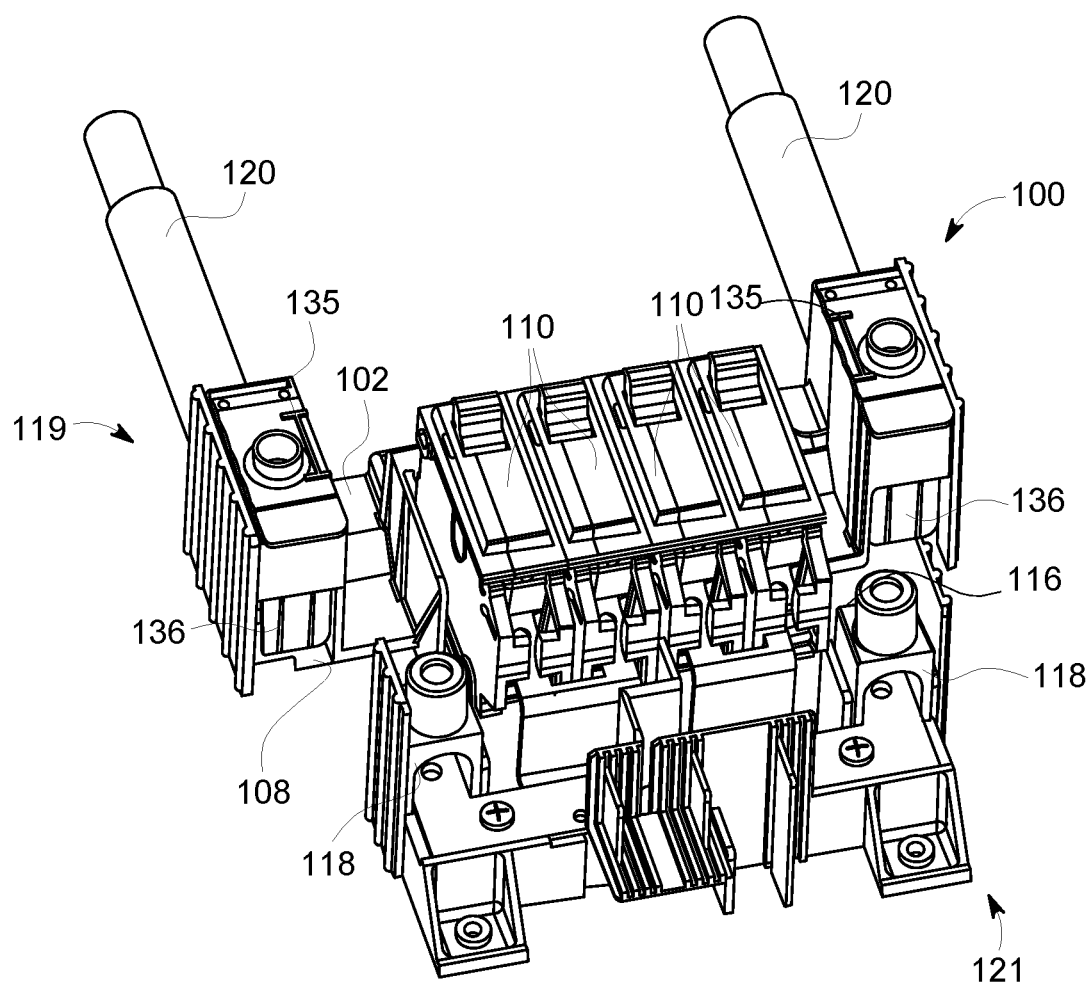
FIG. 1 is a perspective view of an electrical distribution apparatus including a barrier.
Figure 2:
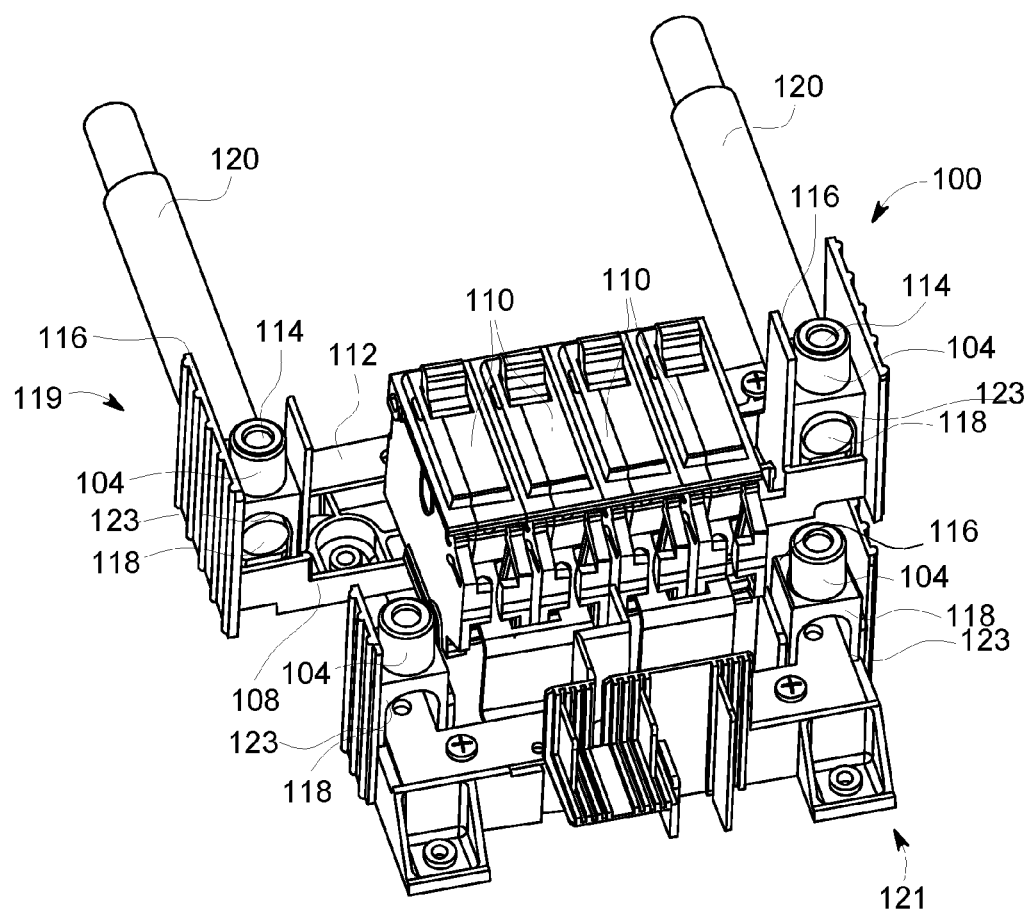
FIG. 2 is a perspective view of the electrical distribution apparatus shown in FIG. 1 with the barrier removed.
Figure 3:
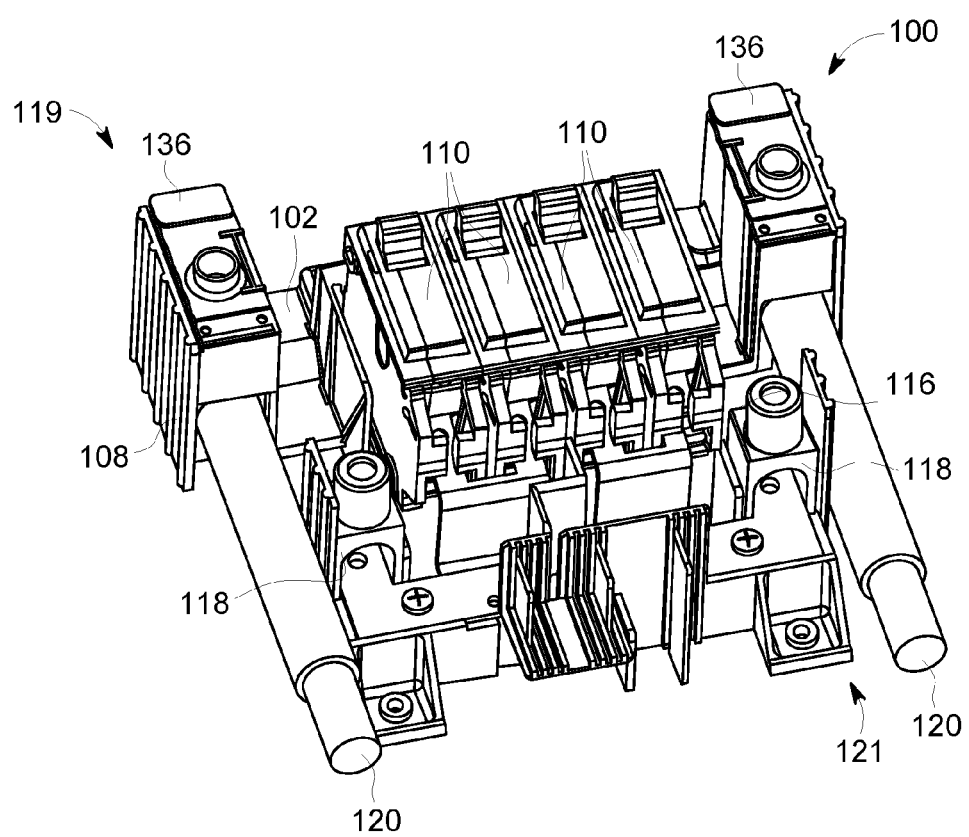
FIG. 3 is a perspective view of a different configuration of the electrical distribution apparatus shown in FIG. 1.

FIG. 1 is a perspective view of an electrical distribution apparatus 100 including a barrier 102. FIG. 2 is a perspective view of electrical distribution apparatus 100 with barrier 102 removed. FIG. 3 is a perspective view of a different configuration of electrical distribution apparatus 100. Electrical distribution apparatus 100 includes barrier 102, terminals 104, broadly power connectors, and a support structure 108 supporting terminals 104. During operation, electrical distribution apparatus 100 is coupled to a circuit such that electrical current flows along a conductive flow path from a line side to a load side. A plurality of electrical devices 110, such as circuit breakers, are coupled to bus bars 112 along the conductive flow path.

In some embodiments, electrical distribution apparatus 100 includes any electrical device 110 that enables electrical distribution apparatus 100 to operate as described herein. For example, in some embodiments, electrical devices 110 include power connectors, operating mechanisms, load straps, movable contacts, and/or trip mechanisms. In the exemplary embodiment, electrical distribution apparatus 100 is coupled to a circuit such that electrical devices 110 control flow of electric current through the circuit. In particular, when an operating mechanism 111 of electrical devices 110 is triggered, i.e., an electrical device 110 is tripped, the flow of electric current through the circuit coupled to electrical distribution apparatus 100 is stopped.

In the exemplary embodiment, bus bars 112 extend between terminals 104 and are coupled to power connectors of electrical devices 110. Each bus bar 112 includes an elongated plate of conductive material. In alternative embodiments, electrical distribution apparatus 100 includes any bus bar 112 that enables electrical distribution apparatus 100 to operate as described herein.

Also, in the exemplary embodiment, barrier 102 is removably coupled to support structure 108 such that barrier 102 restricts access to electrically charged components along the conductive flow path. For example, in the exemplary embodiment, barrier 102 at least partially covers terminals 104, bus bar 112, and electrical devices 110. In alternative embodiments, electrical distribution apparatus 100 includes any barrier that enables electrical distribution apparatus 100 to operate as described herein.

In addition, in the exemplary embodiment, each terminal 104 includes a coupler 114, a first end 116, and a second end 118. First end 116 is opposite second end 118 in the exemplary embodiment. Alternatively, first and second ends 116 and 118 may be located proximate each other (e.g., next to each other) or any relationship relative to one another that enables electrical distribution apparatus 100 to operate as described herein. First end 116 and second end 118 are configured to receive cables or wires 120 for coupling electrical distribution apparatus 100 to a circuit. For example, cables 120 are received by openings 123 in first end 116 and second end 118. Couplers 114 are configured to secure cables 120 to terminals 104. For example, in the exemplary embodiment, each coupler 114 includes a fastener to selectively secure a portion of cable 120 within terminal 104. In alternative embodiments, electrical distribution apparatus 100 includes any terminal that enables electrical distribution apparatus 100 to operate as described herein.

In the exemplary embodiment, cables 120 include electrically conductive materials surrounded by non-electrically conductive materials. At least a portion of the electrically conductive materials are exposed to couple to electrical distribution apparatus 100. The cables 120 are elongated and flexible to couple to electrical distribution apparatus 100. In alternative embodiments, electrical distribution apparatus 100 couples to any cable 120 that enables electrically distribution apparatus 100 to operate as described herein.

Also, in the exemplary embodiment, electrical distribution apparatus 100 is adjustable between different configurations, such as a first configuration and a second configuration. For example, in the configuration of electrical distribution apparatus 100 shown in FIG. 3, cables 120 are coupled to second ends 118 on a first side 119 of electrical distribution apparatus 100. In the configuration of electrical distribution apparatus 100 shown in FIG. 1, cables 120 are coupled to first ends 116 on first side 119 of electrical distribution apparatus 100. In alternative embodiments, electrical distribution apparatus 100 has any configuration that enables electrical distribution apparatus 100 to operate as described herein. For example, in some embodiments, electrical distribution apparatus 100 has a forward feed, a reverse feed, a top feed, and/or a bottom feed. In further embodiments, cables 120 are coupled to any first ends 116 and/or second ends 118 of electrical distribution apparatus 100.

Also, in the exemplary embodiment, barrier 102 is adjustable between multiple configurations to facilitate the different configurations of electrical distribution apparatus 100. In particular, barrier 102 is adjustable between different configurations that selectively restrict access to terminals 104. Accordingly, barrier 102 facilitates cables 120 coupling to electrical distribution apparatus 100 in different positions. For example, in the configuration shown in FIG. 1, barrier 102 substantially covers second ends 118 of terminals 104 and allows cables 120 to couple to first ends 116 of terminals 104. In the configuration shown in FIG. 3, barrier 102 substantially covers first ends 116 of terminals 104 and allows cables 120 to couple to second ends 118 of terminals 104. In alternative embodiments, barrier 102 has any configuration that enables electrical distribution apparatus 100 to operate as described herein. In some embodiments, barrier 102 is able to couple to support structure 108 in more than one position, e.g., barrier 102 is reversible. In further embodiments, barrier 102 facilitates electrical distribution apparatus 100 coupling to cables in any configuration, such as a forward feed configuration and a reverse feed configuration.

Figure 4:
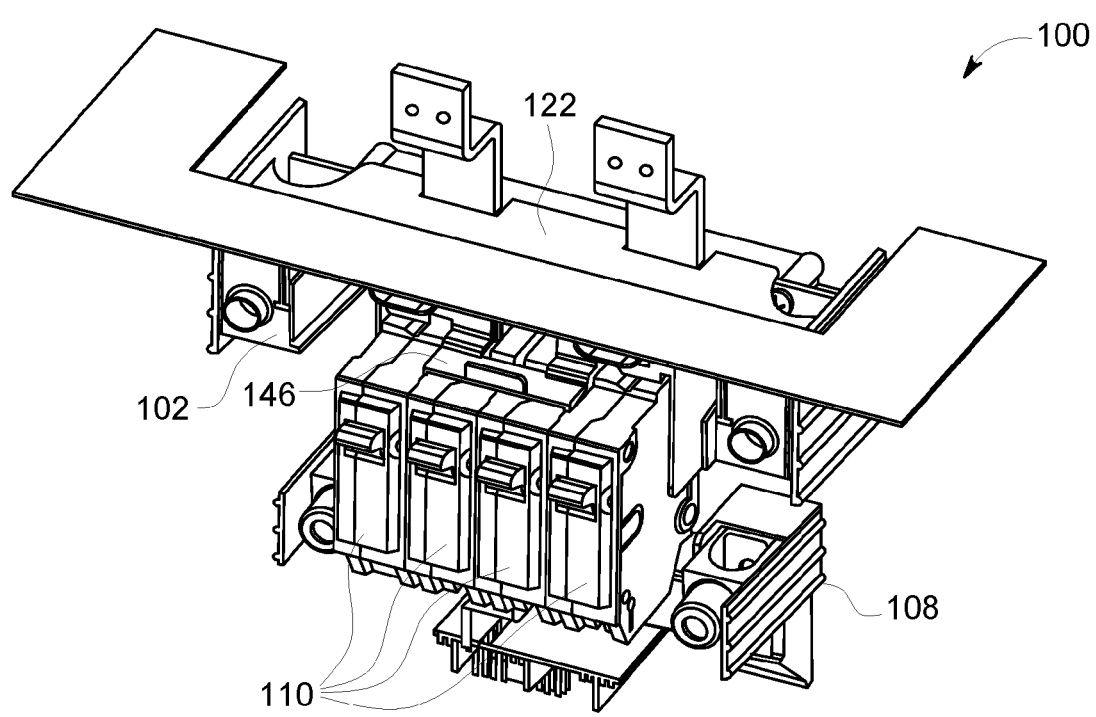
FIG. 4 is a perspective view of the electrical distribution apparatus shown in FIG. 1 configured to couple to a meter.

In some embodiments, electrical distribution apparatus 100 is configured for installation with other components. For example, FIG. 4 is a perspective view of electrical distribution apparatus 100 configured to couple to a meter (not shown). In the exemplary embodiment, barrier 102 facilitates electrical distribution apparatus 100 coupling to the meter and restricting access to electrically conductive components. In particular, barrier 102 includes a wall 122 that restricts access to electrically conductive components of the meter side from electrical distribution apparatus 100. As shown in FIG. 4, barrier 102 provides access to first ends 116 for coupling to the meter and restricts access to other portions of electrical distribution apparatus 100 such as bus bar 112 and second ends 118 of terminals 104. In alternative embodiments, electrical distribution apparatus 100 is coupled to any component that enables electrical distribution apparatus 100 to operate as described herein. In some embodiments, electrical distribution apparatus 100 is coupled to components, such as the meter, using bus bars, lines, and/or any other connection component.

Figure 5:
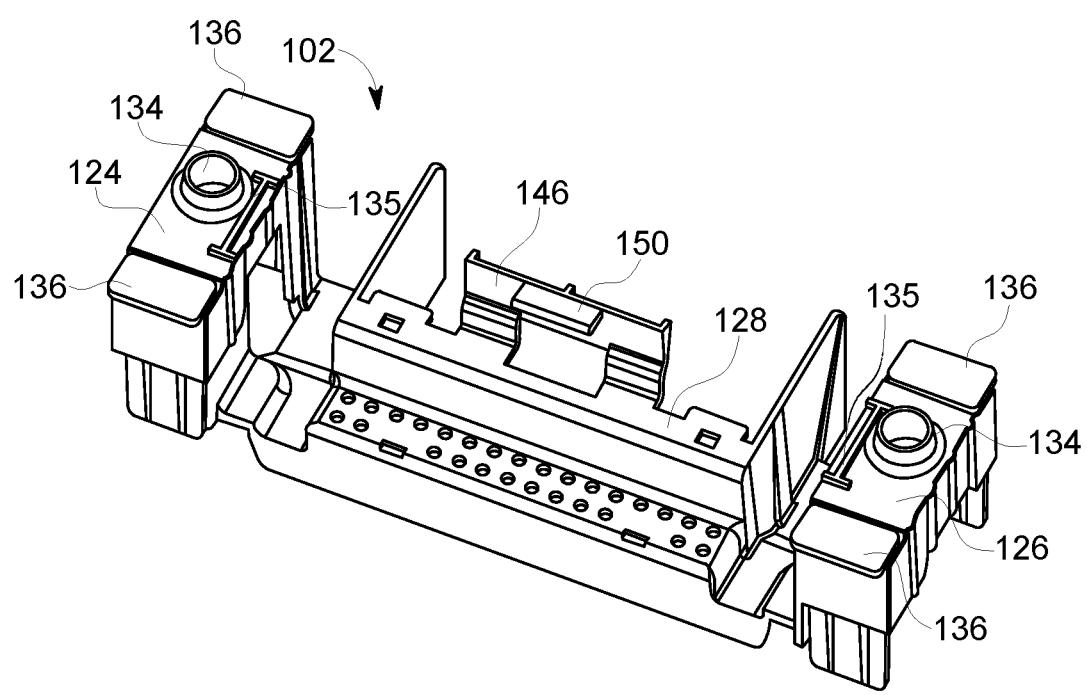
FIG. 5 is a perspective view of the barrier shown in FIG. 1.
Figure 6:
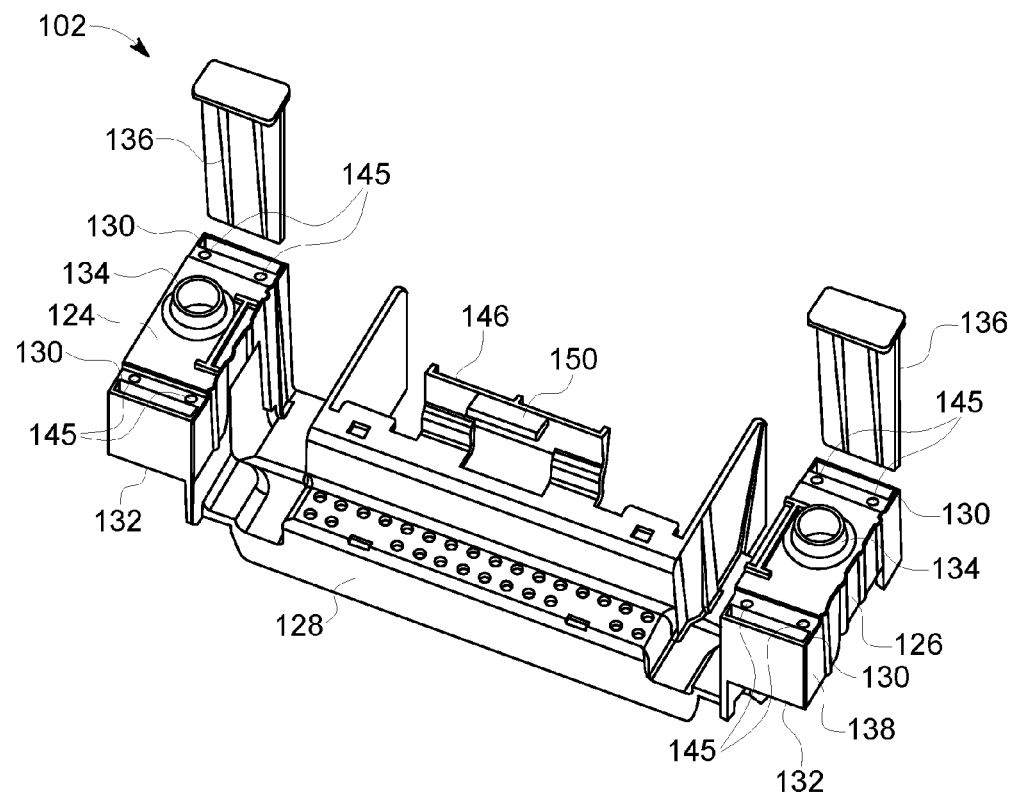
FIG. 6 is a partially exploded perspective view of the barrier shown in FIG. 1.

FIG. 5 is a perspective view of barrier 102. FIG. 6 is a partially exploded perspective view of barrier 102. Barrier 102 includes a first terminal portion 124, a second terminal portion 126, and a middle portion 128. Middle portion 128 extends between first terminal portion 124 and second terminal portion 126. Middle portion 128 is elongated and is configured to cover bus bar 112 (shown in FIG. 1) and power connectors of electrical devices 110 (shown in FIG. 1). First terminal portion 124 and second terminal portion 126 are rectangular cuboid and are configured to cover terminals 104. Also, each of first terminal portion 124 and second terminal portion 126 defines slots 130, end openings 132, and a top opening 134. Slots 130 receive shields 136. End openings 132 allow cables 120 to couple to terminals 104. Top opening 134 is sized to inhibit objects besides tools accessing terminals 104 through top opening 134. A skirt 138 extends around barrier 102 and at least partially defines end openings 132. In alternative embodiments, barrier 102 includes any portion that enables electrical distribution apparatus 100 (shown in FIG. 1) to operate as described herein.

In the exemplary embodiment, each of first terminal portion 124 and second terminal portion 126 includes a strip length gauge 135. Strip length gauge 135 facilitates operators coupling cables to terminals 104 (shown in FIG. 1). For example, strip length gauge 135 indicates the amount of insulation to strip from cables. Accordingly, strip length gauge 135 simplifies coupling cables to terminals 104 and reduces resources and time required for installation.

Also, in the exemplary embodiment, barrier 102 is constructed from plastic. In alternative embodiments, barrier 102 is constructed from any material that enables barrier 102 to operate as described herein. For example, in some embodiments, barrier 102 includes plastics, metals, fibers, rubbers, glass, and any other non-conductive materials.

In addition, in the exemplary embodiment, electrical distribution apparatus 100 further includes shields 136 removably coupled to barrier 102. Shields 136 are removably received within slots 130 in barrier 102 and engage barrier 102. Shields 136 are positionable to selectively restrict access to terminals 104. For example, in some embodiments, shields 136 are positioned in slots 130 adjacent first ends 116 of terminals 104 to restrict access to first ends 116. In further embodiments, shields 136 are positioned in slots 130 adjacent second ends 118 of terminals 104 to restrict access to second ends 118. In alternative embodiments, a shield 136 is positioned in any slot 130 of barrier 102. For example, in some embodiments, a first shield 136 is positioned in slot 130 adjacent first end 116 of terminal 104 and a second shield 136 is positioned in slot 130 adjacent second end 118 of a different terminal 104.

In some embodiments, shields 136 are not positioned in at least some slots 130. For example, in some embodiments, shields 136 are not positioned in slots 130 adjacent second ends 118 of terminals 104 such that barrier 102 allows access to second ends 118. In further embodiments, shields 136 are not positioned in slots 130 adjacent first ends 116 of terminals 104 such that barrier 102 allows access to first ends 116. In further embodiments, slots 130 receive any component that enables electrical distribution apparatus 100 to operate as described herein. For example, in some embodiments, a plug (not shown) is positioned in at least one slot 130.

In some embodiments, barrier 102 includes any component that enables electrical distribution apparatus 100 to operate as described herein. For example, in some embodiments, shields 136 are omitted and barrier 102 includes one or more walls that restrict access to terminals 104. In further embodiments, barrier 102 includes, without limitation, a rail assembly, a wall and door assembly, one or more removable components, a movable component such as a hinged or sliding component, a plug, and any other adjustable component that enables barrier 102 to operate as described herein.

In some embodiments, barrier 102 is movably coupled to electrical distribution apparatus 100 such that barrier 102 rotates or pivots between positions or configurations. For example, in some embodiments, an end of barrier 102 is coupled to support 108 by a hinge (not shown) and barrier 102 rotates about the hinge. In further embodiments, a portion of barrier 102 is hinged relative to another portion of barrier 102. In some embodiments, barrier 102 includes, without limitation, a living hinge, a butt hinge, a barrel hinge, a composite hinge, and/or any other hinge. In further embodiments, barrier 102 is rotatable about a rotation axis between different positions. For example, in some embodiments, barrier 102 is at least partially coupled to electrical distribution apparatus 100 by a pin (not shown) and at least a portion of barrier 102 is configured to rotate about the pin.

Figure 7:
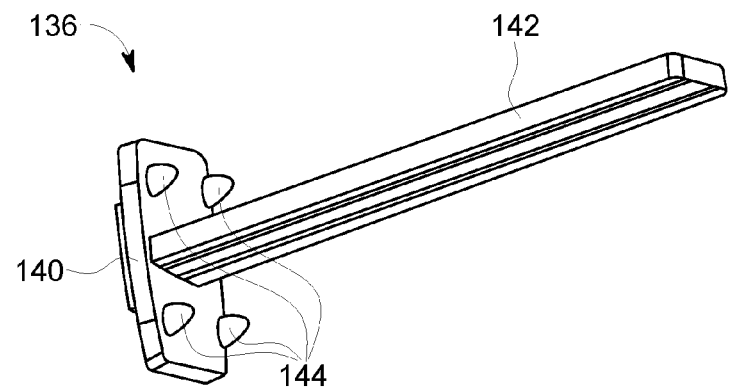
FIG. 7 is a perspective view of a shield.
Figure 8:
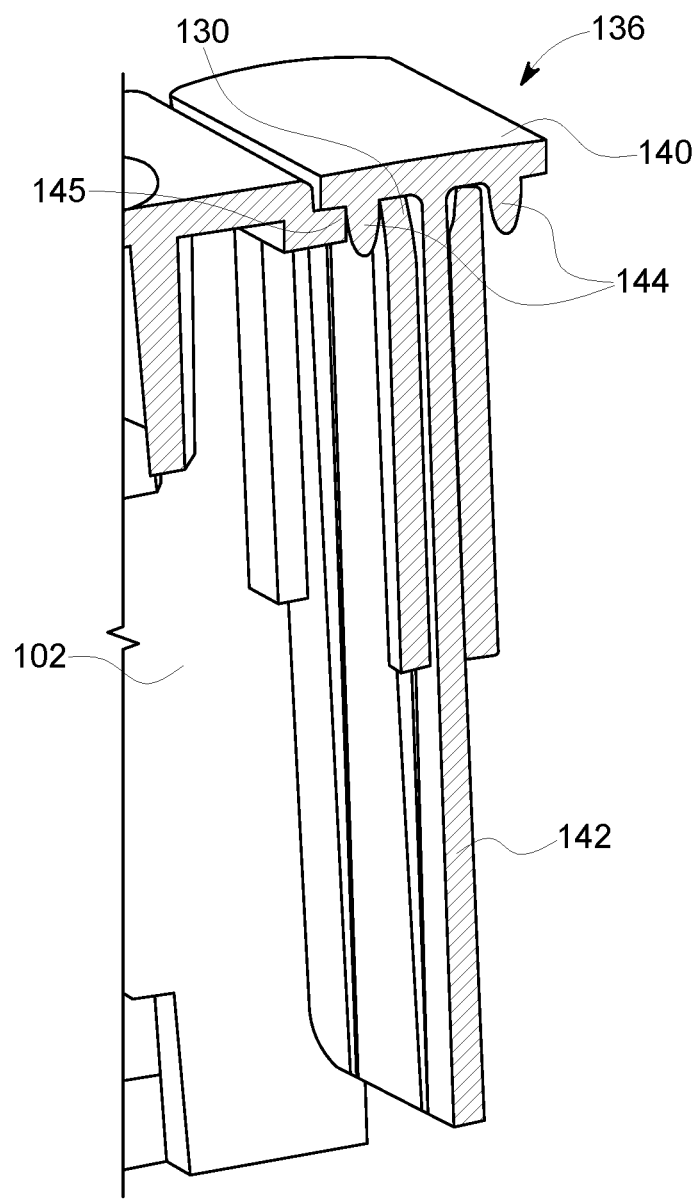
FIG. 8 is a sectional view of the shield shown in FIG. 7 coupled to the barrier shown in FIG. 1.

FIG. 7 is a perspective view of shield 136. FIG. 8 is a sectional view of shield 136 coupled to barrier 102. Each shield 136 includes a head 140 and a stem 142. Stem 142 is configured to fit within slot 130. Head 140 is larger than slot 130 and is configured to rest against barrier 102 when stem 142 is fully inserted into slot 130. In alternative embodiments, electrical distribution apparatus 100 includes any shield 136 that enables electrical distribution apparatus 100 to operate as described herein.

Also, in the exemplary embodiment, shield 136 includes engagement features in the form of protrusions 144 that engage barrier 102 when shield 136 is inserted into slot 130. Protrusions 144 are received in openings 145 in barrier 102. Accordingly, protrusions 144 facilitate alignment of shield 136 in slot 130 and secure shield 136 in position. In alternative embodiments, shield 136 and/or barrier 102 includes any engagement feature that enables electrical distribution apparatus 100 to operate as described herein. For example, in some embodiments, barrier 102 includes protrusions and shield 136 includes openings to receive the protrusions. In further embodiments, barrier 102 and/or shield 136 includes, without limitation, latches, clips, adhesive, straps, and any other engagement feature.

In addition, in the exemplary embodiment, shields 136 are positioned without the use of tools. For example, during operation, an operator inserts shield 136 into a desired slot 130 and presses on head 140 until protrusions 144 engage barrier 102. To remove shield 136, an operator applies a force on head 140 in a direction away from barrier 102 and protrusions 144 disengage barrier 102. In alternative embodiments, shields 136 are positioned in any manner that enables electrical distribution apparatus 100 to operate as described herein. For example, in some embodiments, shield 136 is secured to barrier 102 using fasteners in addition to or in place of protrusions 144.

Figure 9:
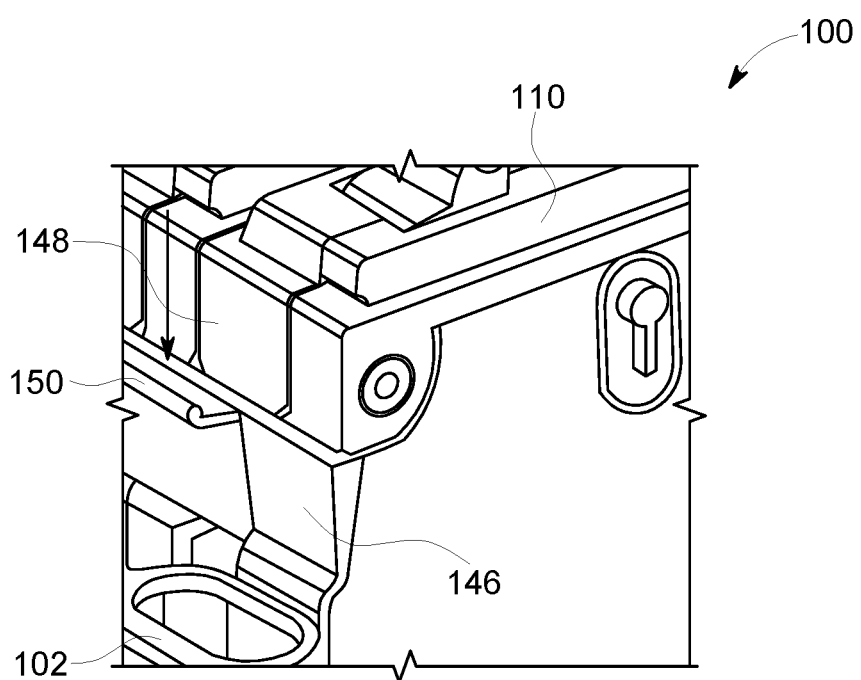
FIG. 9 is a perspective view of a portion of the electrical distribution apparatus shown in FIG. 1 including an engagement feature.

FIG. 9 is a perspective view of a portion of electrical distribution apparatus 100 including an engagement feature 146. In the exemplary embodiment, engagement feature 146 facilitates barrier 102 removably coupling to other components of electrical distribution apparatus 100, such as terminals 104 and support structure 108, without the use of tools. Engagement feature 146 is flexible and automatically engages other portions of electrical distribution apparatus 100 to secure barrier 102 in position. In the exemplary embodiment, engagement feature 146 includes a ridged wall that extends from middle portion 128. In alternative embodiments, electrical distribution apparatus 100 includes any engagement feature that enables electrical distribution apparatus 100 to operate as described herein.

In the exemplary embodiment, engagement feature 146 engages a ledge 148 of electrical distribution apparatus 100. In the exemplary embodiment, electrical devices 110 define ledge 148. In alternative embodiments, engagement feature 146 engages any component that enables electrical distribution apparatus 100 to operate as described herein. For example, in some embodiments, support structure 108 (shown in FIG. 1) is configured to engage engagement feature 146. In further embodiments, at least one of terminals 104 is configured to engage engagement feature 146. In some embodiments, barrier 102 is coupled to bus bars 112 (shown in FIG. 1).

Also, in the exemplary embodiment, during operation, an operator positions barrier 102 adjacent support structure 108 and applies a force on barrier 102 to move barrier 102 towards support structure 108. Engagement feature 146 engages ledge 148 and couples barrier 102 to terminals 104, bus bar 112, electrical devices 110, and support structure 108. Engagement feature 146 couples barrier 102 in position without the use of tools. In addition, in some embodiments, the operator adjusts barrier 102 between different configurations that facilitate different connections of electrical distribution apparatus 100. As a result, barrier 102 reduces the time and resources required to install electrical distribution apparatus 100. Moreover, barrier 102 facilitates installation of electrical distribution apparatus 100 at remote sites in different configurations without additional components and/or tools. In alternative embodiments, barrier 102 is coupled to support structure 108 in any manner that enables electrical distribution apparatus 100 to operate as described herein. For example, in some embodiments, engagement feature 146 is biased. In further embodiments, barrier 102 is secured in position using fasteners in place of or in addition to engagement feature 146. In further embodiments, barrier 102 is coupled to electrical distribution apparatus 100 using screws, nails, bolts, ties, buckles, buttons, snaps, clips, pins, adhesives, and/or any securement component.

In addition, in the exemplary embodiment, barrier 102 includes removal feature 150 to facilitate removal of barrier 102 from support structure 108. Removal feature 150 includes a tab that extends from engagement feature 146 in a direction perpendicular to the insertion direction of barrier 102. To remove barrier 102, an operator presses removal feature 150 towards support structure 108 and engagement feature 146 disengages ledge 148. In alternative embodiments, barrier 102 includes any removal feature 150 that enables electrical distribution apparatus 100 to operate as described herein. For example, in some embodiments, removal feature 150 includes, without limitation, a latch, a lever, a biasing member, a catch, an actuator, and any other removal feature. In further embodiments, removal feature 150 is omitted.

Figure 10:
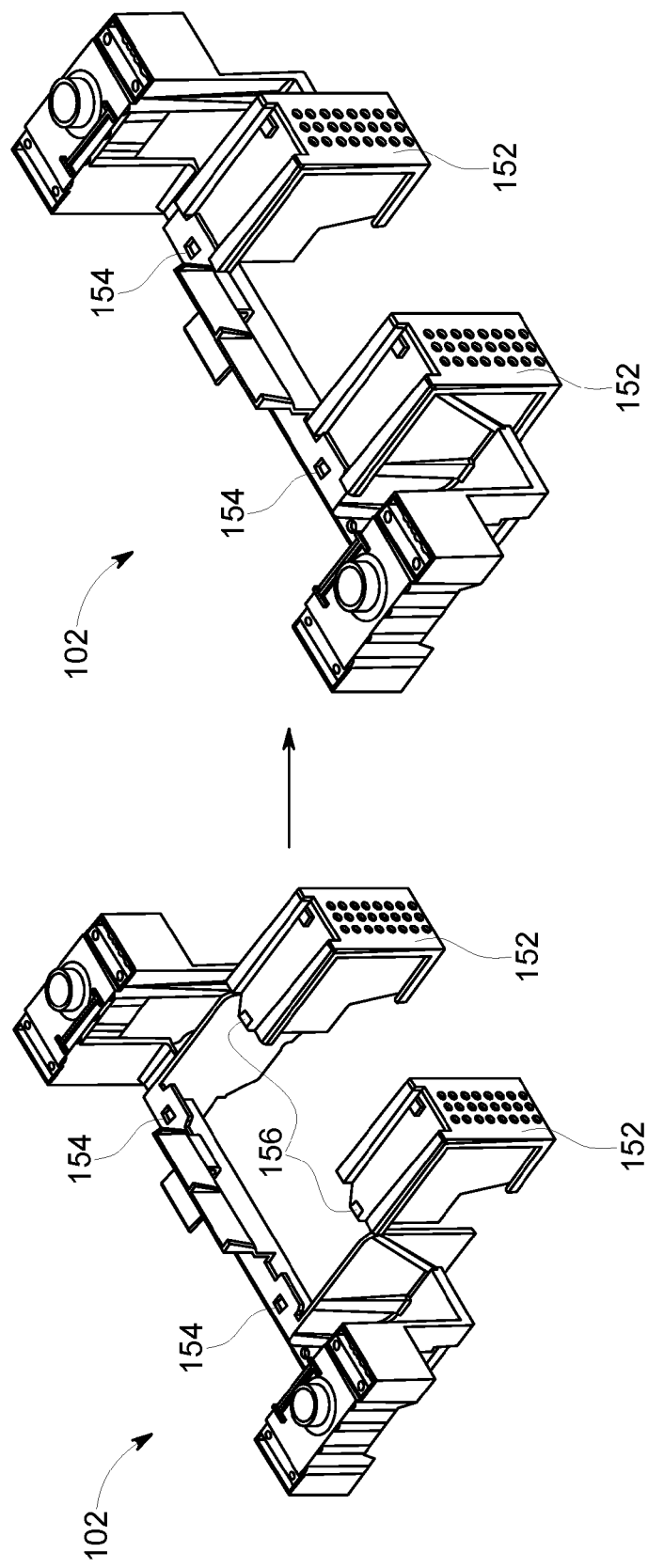
FIG. 10 is a schematic of the barrier shown in FIG. 1 adjusting from a 4-pole configuration to a 2-pole configuration.
Figure 11:
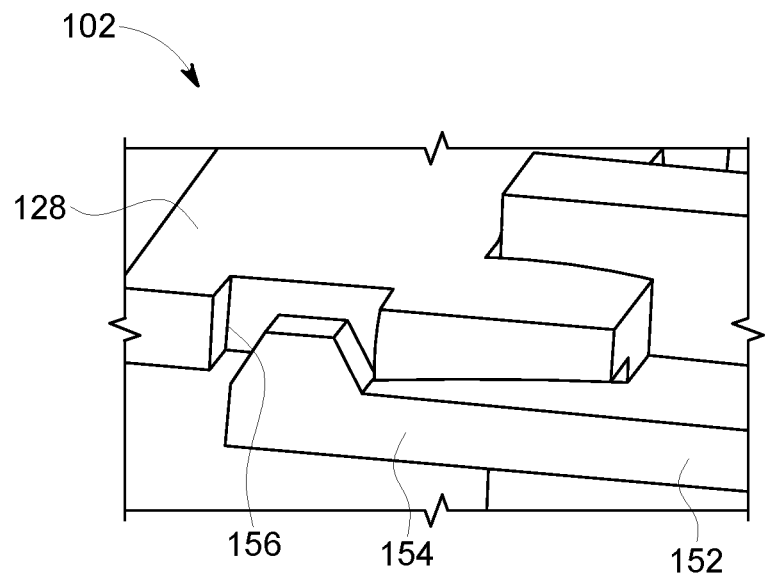
FIG. 11 is a sectional view of a portion of the barrier shown in FIG. 1 in a 2-pole configuration.
Figure 12:
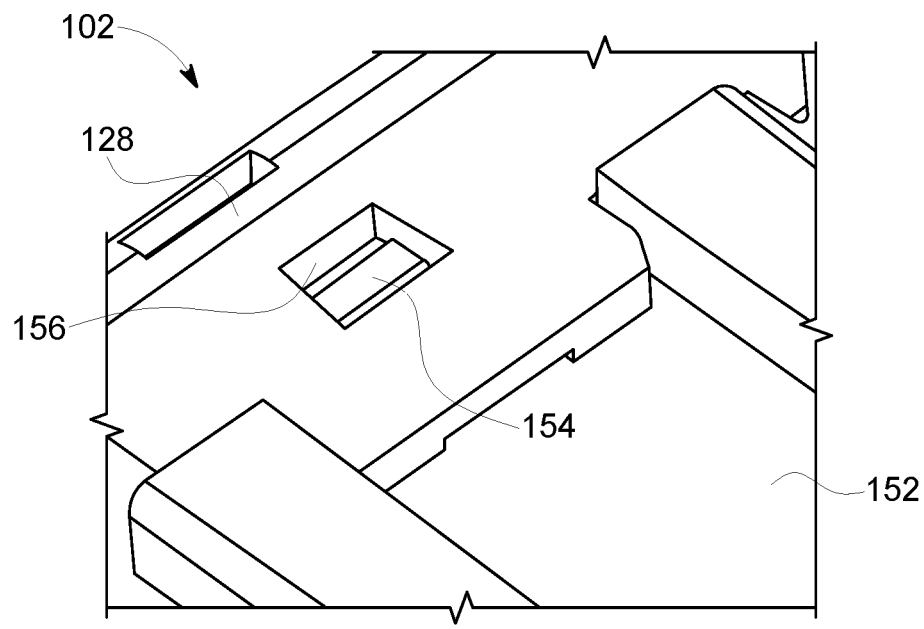
FIG. 12 is a perspective view of a portion of the barrier shown in FIG. 1 in a 2-pole configuration.

FIG. 10 is a schematic perspective view of barrier 102 adjusting from a 4-pole configuration to a 2-pole configuration. FIG. 11 is a sectional view of a portion of barrier 102 in a 2-pole configuration. FIG. 12 is a perspective view of a portion of barrier 102 in a 2-pole configuration. As shown in FIGS. 10-12, in some embodiments, electrical distribution apparatus 100 further includes covers 152 selectively coupled to barrier 102. Covers 152 couple to barrier 102 to cover empty electrical poles of electrical distribution apparatus 100. Accordingly, covers 152 restrict access to electrically charged components of electrical distribution apparatus 100 when electrical distribution apparatus 100 is in a 2-pole configuration. When covers 152 are decoupled from barrier 102, such as in the configuration shown in FIG. 1, barrier 102 facilitates electrical distribution apparatus 100 having a 4-pole configuration. In particular, electrical distribution apparatus 100 has an electrical device 110 (shown in FIG. 1) coupled to each open electrical pole in both the 4-pole configuration and the 2-pole configuration. Covers 152 cover electrical poles that are not occupied by electrical devices 110. In alternative embodiments, electrical distribution apparatus 100 is configured to have any pole configuration that enables electrical distribution apparatus 100 to operate as described herein.

Also, in the exemplary embodiment, barrier 102 is adjustable between the 2-pole configuration and the 4-pole configuration without the use of tools. In particular, covers 152 are coupled to and removed from barrier 102 without the use of tools. As shown in FIG. 10, covers 152 include engagement features in the form of flexible fingers 154 that are received in openings 156 defined by barrier 102. During operation, flexible fingers 154 are displaced by barrier 102 to facilitate coupling and removal of covers 152. When flexible fingers 154 are positioned in openings 156, flexible fingers 154 inhibit removal of covers 152 until a force is applied to covers 152 and/or barrier 102 that causes barrier 102 to displace flexible fingers 154. In alternative embodiments, cover 152 and/or barrier 102 includes any engagement feature that enables electrical distribution apparatus 100 to operate as described herein.

Figure 13:
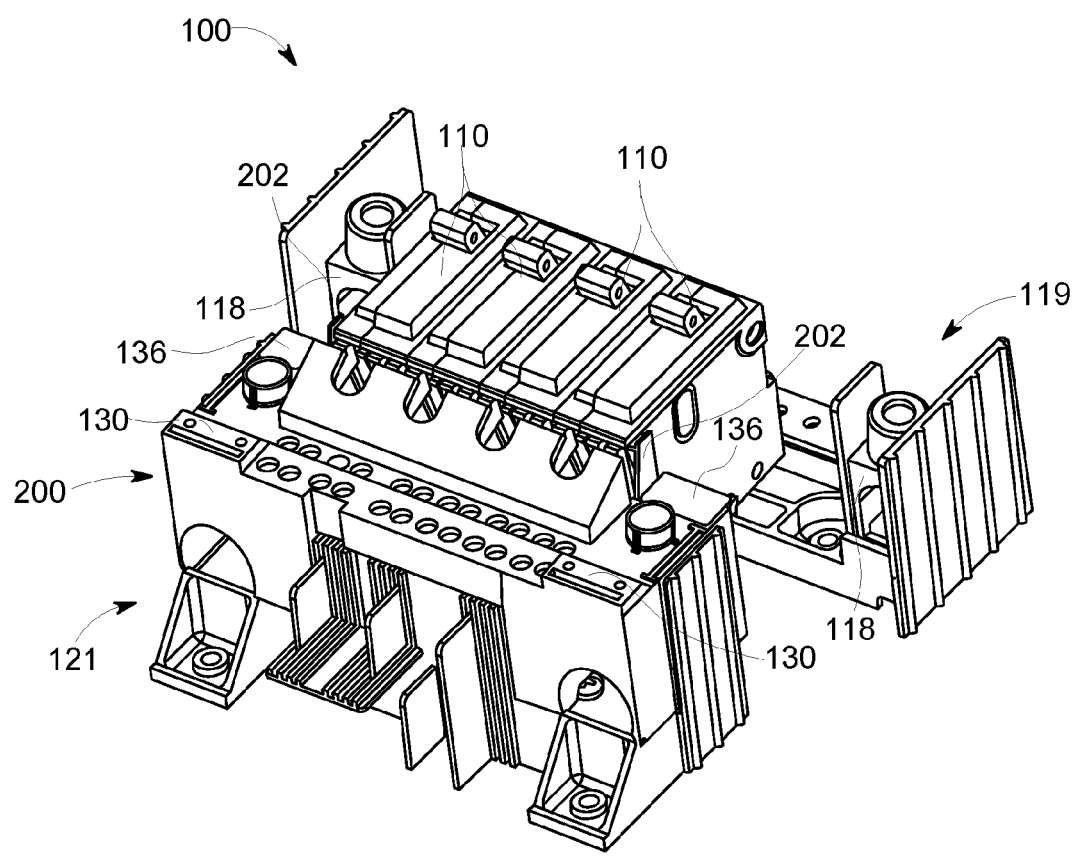
FIG. 13 is a perspective view of the electrical distribution apparatus shown in FIG. 1 including an exemplary embodiment of a barrier.

FIG. 13 is a perspective view of electrical distribution apparatus 100 including a barrier 200. In the configuration of electrical distribution apparatus 100 shown in FIG. 13, a second side 121 is configured to couple to a live circuit and first side 119 is configured to couple to a load. Accordingly, electrical distribution apparatus 100 is configured for a reverse feed. In alternative embodiments, electrical distribution apparatus 100 has any configuration that enables electrical distribution apparatus 100 to operate as described herein.

In the exemplary embodiment, barrier 200 is positioned on second side 121 and restricts access to electrically conductive components of electrical distribution apparatus 100. For example, shields 136 are positioned in slots 130 of barrier 200 to restrict access to terminals 104 (shown in FIG. 1). In alternative embodiments, electrical distribution apparatus 100 includes any barrier 200 that enables electrical distribution apparatus 100 to operate as described herein.

Also, in the exemplary embodiment, barrier 200 includes engagement features 202 to facilitate barrier 200 removably coupling to other components of electrical distribution apparatus 100, such as terminals 104 (shown in FIG. 1) and support structure 108, without the use of tools. Engagement features 202 are flexible and automatically engage other portions of electrical distribution apparatus 100 to secure barrier 200 in position. In the exemplary embodiment, engagement features 202 includes arms that extend on opposite sides of barrier 200 and couple to sides of electrical devices 110. In alternative embodiments, electrical distribution apparatus 100 includes any engagement feature that enables electrical distribution apparatus 100 to operate as described herein.

Figure 14:
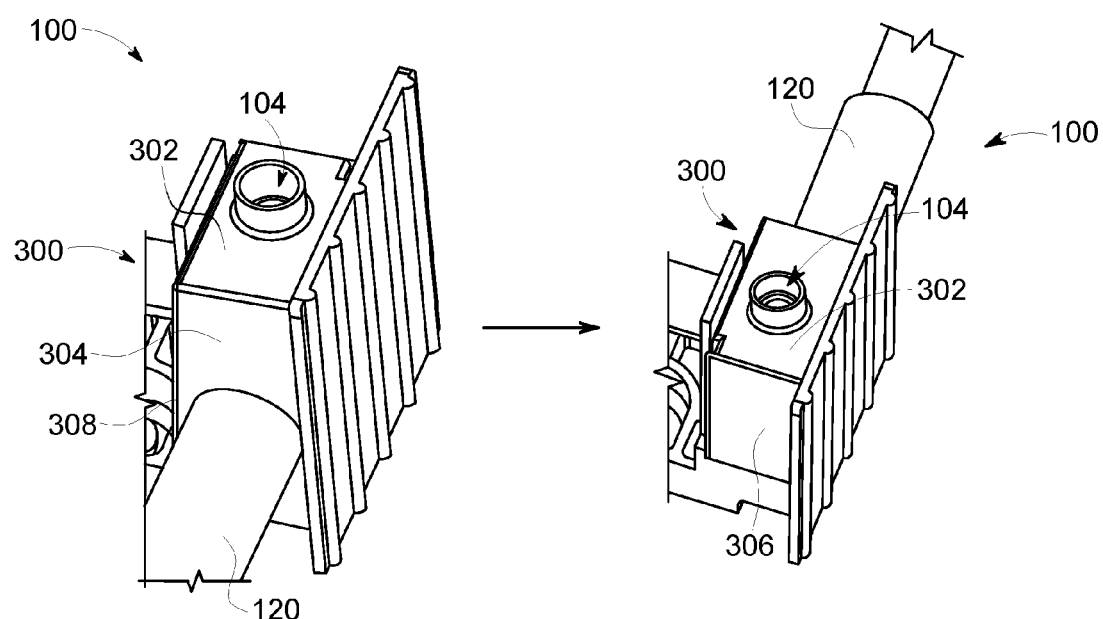
FIG. 14 is a schematic of different configurations of the electrical distribution apparatus shown in FIG. 1 including a barrier.

FIG. 14 is a schematic of different configurations of electrical distribution apparatus 100 including a barrier 300. Electrical distribution apparatus 100 is adjustable between a first configuration, i.e., a first position, and a second configuration, i.e., a second position. In the first configuration, terminal 104 is configured to receive cable 120 from a bottom feed. In the second configuration, terminal 104 is configured to receive cable 120 from a top feed. In alternative embodiments, electrical distribution apparatus 100 has any configuration that enables electrical distribution apparatus 100 to operate as described herein.

In the exemplary embodiment, barrier 300 is configured to couple directly to terminal 104. In addition, barrier 300 is reversible. Barrier 300 includes a body 302 including an opened side 304 and a closed side 306. Opened side 304 defines an opening 308 arranged to receive cable 120. Closed side 306 is opposite opened side 304 and restricts access to terminal 104. Closed side 306 is substantially free of openings. In alternative embodiments, electrical distribution apparatus 100 includes any barrier 300 that enables electrical distribution apparatus 100 to operate as described herein. For example, in some embodiments, barrier 300 includes one or more positionable components.

During operation, in the exemplary embodiment, barrier 300 is positioned such that opened side 304 receives cable 120 coupled to terminal 104 and closed side 306 is adjacent the end of terminal 104 that does not receive cable 120. In some embodiments, when electrical distribution apparatus 100 is switched between different configurations, barrier 300 is reversed. For example, in some embodiments, when electrical distribution apparatus is adjusted to receive cable 120 from a different feed, barrier 300 is positioned such that opened side 304 and closed side 306 are reversed. In alternative embodiments, electrical distribution apparatus 100 is adjusted in any manner that enables electrical distribution apparatus 100 to operate as described herein.

In reference to FIGS. 1 and 2, a method of assembling electrical distribution apparatus 100 includes coupling terminal 104 to support structure 108 and coupling barrier 102 to terminal 104 such that barrier 102 extends adjacent and restricts access to terminal 104. The method also includes adjusting barrier 102 between a first configuration and a second configuration. Barrier 102 is configured to restrict access to first end 116 when barrier 102 is in the first configuration and barrier 102 is configured to restrict access to second end 118 when barrier 102 is in the second configuration. In some embodiments, the method includes coupling barrier 102 to terminal 104 such that barrier 102 allows access to second end 118 when barrier 102 is in the first configuration. In further embodiments, the method further includes coupling cable 120 to second end 118. In some embodiments, the method also includes coupling shield 136 to barrier 102 adjacent one of first end 116 and second end 118.

The electrical distribution apparatus described above generally include a removable barrier that restricts access to electrically conductive components of the electrical distribution apparatus. The removable barrier has multiple configurations that facilitate different electrical connections between the electrical distribution apparatus and a circuit. In addition, in some embodiments, removable shields are selectively coupled to the barrier to restrict access to electrically charged components of the electrical distribution apparatus. In addition, in some embodiments, the barrier is secured in position and adjusted without the use of tools.

An exemplary technical effect of the methods, systems, and apparatus described herein includes at least one of: (a) reducing cost to assemble electrical distribution apparatus; (b) providing adjustable barriers that restrict access to electrical distribution apparatus; (c) providing electrical distribution apparatus that are installed in the field without the use of tools; and (d) providing electrical distribution apparatus that facilitate different cable connections.

Exemplary embodiments of electrical distribution apparatus and methods of manufacturing electrical distribution apparatus are described above in detail. The electrical distribution apparatus and methods are not limited to the specific embodiments described herein but, rather, components of the electrical distribution apparatus and/or operations of the methods may be utilized independently and separately from other components and/or operations described herein. Further, the described components and/or operations may also be defined in, or used in combination with, other systems, methods, and/or devices, and are not limited to practice with only the electrical distribution apparatus and systems described herein.

The order of execution or performance of the operations in the embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electrical distribution apparatus comprising:
    a power connector for coupling to a cable, said power connector including a first end and a second end each defining an opening arranged to receive the cable; and
    a barrier removably coupled to a portion of said electrical distribution apparatus and selectively adjustable between a first position and a second position, said barrier arranged to prevent insertion of the cable into the first end opening and to permit insertion of the cable into the second end opening when said barrier is in the first position, said barrier arranged to prevent insertion of the cable into the second end opening and to permit insertion of the cable into the first end opening when said barrier is in the second position.

2. The electrical distribution apparatus in accordance with claim 1 further comprising a shield removably coupled to said barrier.

3. The electrical distribution apparatus in accordance with claim 2, wherein said shield is coupled to said barrier adjacent said first end when said barrier is in the first position and said shield is coupled to said barrier adjacent said second end when said barrier is in the second position.

4. The electrical distribution apparatus in accordance with claim 2, wherein said barrier includes at least one slot defined thereon to receive said shield therein.

5. The electrical distribution apparatus in accordance with claim 2, wherein at least one of said barrier and said shield includes an engagement feature arranged to couple said shield to said barrier.

6. The electrical distribution apparatus in accordance with claim 1, wherein said barrier is hingedly coupled to the portion of said electrical distribution apparatus such that at least a portion of said barrier is arranged to rotate when said barrier is moved between the first position and the second position.

7. The electrical distribution apparatus in accordance with claim 1 further comprising at least one cover removably coupled to said barrier, wherein said barrier is further arranged to provide access to a first number of electrical poles coupleable to electrical devices when said at least one cover is removed from said barrier and said barrier is further arranged to provide access to a second number of electrical poles coupleable to electrical devices when said at least one cover is coupled to said barrier, wherein the first number of electrical poles is greater than the second number of electrical poles.

8. The electrical distribution apparatus in accordance with claim 1 further comprising an engagement feature arranged to removably couple said barrier to the portion of said electrical distribution apparatus.

9. The electrical distribution apparatus in accordance with claim 8, wherein said barrier further includes a removal feature to facilitate removal of said barrier from said power connector.

10. The electrical distribution apparatus in accordance with claim 1, wherein said barrier is coupleable to a line side and a load side of said electrical distribution apparatus.

11. A barrier for an electrical distribution apparatus, said barrier comprising an engagement feature to removably couple said barrier to the electrical distribution apparatus, wherein said barrier is selectively adjustable between a first position and a second position, said barrier arranged to prevent insertion of a cable into an opening defined by a first end of a power connector and to permit insertion of the cable into an opening defined by a second end of the power connector when said barrier is in the first position, said barrier arranged to prevent insertion of the cable into the second end opening of the power connector and to permit insertion of the cable into the first end opening of the power connector when said barrier is in the second position.

12. The barrier in accordance with claim 11 further comprising a removal feature arranged to facilitate removal of said barrier from said power connector.

13. The barrier in accordance with claim 11, wherein said engagement feature is arranged to couple said barrier and said power connector without the use of tools.

14. The barrier in accordance with claim 11 further comprising a removable shield.

15. The barrier in accordance with claim 13, wherein said shield is positioned adjacent the first end when said barrier is in the first position, and said shield positioned adjacent the second end when said barrier is in the second position.

16. The barrier in accordance with claim 11, wherein said shield engages a slot defined in a terminal portion of said barrier.

17. The barrier in accordance with claim 11 further comprising at least one removable cover, wherein said barrier is further arranged to provide access to a first number of electrical poles coupleable to electrical devices when said at least one cover is removed, wherein said barrier is further arranged to provide access to a second number of electrical poles coupleable to electrical devices when said at least one cover is not removed, and wherein the first number of electrical poles is greater than the second number of electrical poles.

18. A method of assembling an electrical distribution apparatus comprising:
    coupling a power connector to a support structure, the power connector including a first end and a second end each defining an opening arranged to receive a cable;
    coupling a barrier to the electrical distribution apparatus such that the barrier extends over the power connector; and
    adjusting the barrier between a first position and a second position, wherein the barrier is arranged to prevent insertion of the cable into the first end opening and to permit insertion of the cable into the second end opening when the barrier is in the first position, and wherein the barrier is arranged to prevent insertion of the cable into the second end opening and to permit insertion of the cable into the first end opening when the barrier is in the second position.

19. The method in accordance with claim 18 further comprising coupling the cable to the second end of the power connector when the barrier is in the first position.

20. The method in accordance with claim 18 wherein adjusting the barrier between a first position and a second position comprises coupling a removable shield to the barrier adjacent one of the first end and the second end.

* * * * *